Patented May 1, 1945

2,374,886

UNITED STATES PATENT OFFICE 2,374,886

METHOD OF TREATING LEAD OXIDE

John S. Nordyke and Leonard Vaughn, Joplin, Mo., assignors to The Eagle-Picher Lead Company, Cincinnati, Ohio, a corporation of Ohio No Drawing. Application May 7, 1941, Serial No. 392,391

6 Claims. (Cl. 23—146)

This invention relates to lead oxide and a method of treating same whereby we are enabled to change the physical and chemical nature thereof and produce a lead oxide having predetermined characteristics of particle size, chemical nature, lead content and crystalline structure.

The completion of a chemical reaction is dependent in large part upon the mass of the reacting ingredients, the size of the reaction particles and their proximity to one another, the temperature and the time of exposure to reaction temperature. Generally speaking, mass and size and proximity of particles are susceptible of satisfactory control. It is recognized that many reactions are favored by an increase in temperature, the higher the temperature the more complete the reaction in a definite time. Particularly in metallurgical procedures are control of temperature and time of exposure necessary or desirable, as in the production of metallic oxides from their metals or related oxides.

It is the present practice to convert lead monoxide (such as litharge or massicot) to red lead in hand rabbled or mechanical furnaces at a temperature of 875–925° F. by a batch process. By this method the furnace charge is exposed to the heat and oxygen by the slow plowing action of the rabbles so that a period of from 8 to 24 hours is required to bring about the desired results. When the formation of red lead is complete, the mass is discharged into carts, where it remains until cool, and is then milled to reduce agglomerates and provide the uniform particle size required. This standard form of operation is slow and expensive.

The lead product commonly known as brown oxide consists of particles with a coating of tetragonal lead oxide on a core of metallic lead with the percentage of free metallic lead varying over a wide range. This product in the past has been converted to litharge by calcining at a temperature varying from approximately 1100° F.–1300° F. for many hours in the mechanical furnace. In those cases where the desired end product is the yellow form of lead oxide or massicot the use of mechanical furnace is not considered effective. This is due to the combined action of the heat and the mechanical action of plows whereby hard agglomerates are formed which require severe milling in order to obtain a product of the desired fineness. It is a well known fact that the yellow rhombic form of lead monoxide is converted to the red tetragonal form by attritional action. Thus the best that can be obtained by the old procedure is a lead monoxide consisting of approximately 85% of the yellow form and approximately 15% of the red form.

Our process contemplates the continuous introduction of litharge, massicot or brown oxide, into a heated zone under critical conditions of exposure to heat and oxygen and subjecting the charge to a sudden rise in temperature to effect the quick formation of the desired finished product and rapidly cooling the formed product to retard the growth of particle size and to produce a lead oxide having predetermined characteristics of particle size, chemical nature, lead content and crystalline structure.

The following examples are given to illustrate the carrying out of our process.

Example I

In order to convert sublimed litharge, or lead monoxide, to red lead or minium, the product to be treated is deposited in a substantially horizontal plane at a uniform depth upon a standard type of conveyor such as a vibratory electromagnetic conveyor, the channel of which is constructed of heat resisting metal such as 18—8 stainless steel which will permit critical exposure of the individual particles to heat and oxygen for a definitely regulated time. We have found that a depth of burden of ⅛" or less may be used with satisfactory results. The charge is moved by a conveyor, preferably of the vibratory type into a furnace where the temperature of the charge is quickly raised to approximately 925° F. and is maintained at that temperature by the action of gas burners, preferably of the radiant heat type. The burners are suspended above the conveyor at a distance of approximately 6" and direct their infra red radiation downward upon the charge. Upon leaving the furnace it is discharged on to a secondary cooling conveyor of the electromagnetic vibratory type—the channel of which may be water-jacketed, and quickly cooled to approximately 100° F. while being conveyed to the packer. By maintaining the charge at a critical thickness of approximately ⅛" and maintaining it in this condition the relative motion of the particle is such that a uniform rate of speed and uniform rate of exposure to the heat and oxygen is maintained for the time period necessary to convert substantially all the product to red lead or minium. In the foregoing example, the depth of burden, the temperature of the material and time of exposure of the particles to the temperature may be regarded as critical.

Example II

Brown oxide or leady oxide of the red tetragonal system is converted into massicot of the yellow rhombic crystal system in much the same manner as lead monoxide is converted to red lead or minium. The material is deposited in a layer approximately 1/8" or less in thickness on an electromagnetic conveyor mounted in substantially a horizontal plane and in this condition is advanced into the furnace where it is raised to a temperature of approximately 1200° F. and exposed for approximately 12 seconds to the effect of heat and oxygen at which time the combustion is complete and the material is advanced out of the furnace on to a secondary conveyor where it is cooled to approximately 100° F. while being conveyed to the packer. By maintaining the charge at a critical thickness of approximately 1/8" and maintaining it in this condition the relative motion of the particles is such that a uniform rate of speed and uniform rate of exposure to the temperature and oxygen is maintained for approximately 12 seconds which is sufficient to convert substantially all the product to massicot or yellow rhombic lead monoxide. By reason of the rapid cooling of the product the formation of red lead is substantially prevented. The rapid conversion in the furnace combined with sudden cooling substantially eliminates the formation of agglomerates and obviates the necessity of milling. Our process enables us to produce a yellow modification lead monoxide of high purity substantially free from metallic lead, red lead, tetragonal litharge or undesired agglomerates. In the foregoing example we have found the depth of burden, the temperature of the material and the time of exposure of the particles to the temperature may be regarded as critical.

Example III

In order to convert litharge of the red tetragonal crystalline type, but free from metallic lead, to massicot, a layer substantially 1/8" or less in thickness is deposited on an electromagnetic conveyor in a substantially horizontal plane at a uniform depth. The material is advanced into a heated furnace having an oxidizing atmosphere where the temperature of the product is raised to approximately 1200° F. and maintained in this condition for approximately 20 seconds when it is removed from the heat of the furnace and discharged on to a secondary conveyor where it is cooled to approximately 100° F. while being conveyed to the packer. Since there is no metallic lead present to provide heat of combustion approximately 20 seconds exposure to the infra red radiation of the burners is required.

By maintaining the charge at a critical thickness of approximately 1/8" and maintaining it in this condition the relative motion of the particle is such that a uniform rate of speed and uniform rate of exposure to the heat and oxygen is maintained for approximately 20 seconds which is sufficient to convert substantially all the product to the yellow rhombic crystalline type. In the foregoing example we have found the depth of the burden, the temperature of the material and the time of exposure of the particles to the temperature may be regarded as critical.

Any suitable standard device maintaining particle space relationships in a plane may be used in the practice of the invention and where we have mentioned the magnetic type of conveyor, other well known types may be used. We have found that with the apparatus we used, in order to prevent undue agglomeration of the particles the frequency of vibration of the electromagnetic conveyor should be in excess of 2800 per minute, with approximately 3600 preferred, and the length of stroke should not exceed 1/64 inch. For this reason the range of vibration frequency in excess of 2800 per minute and length of stroke less than 1/64 inch may be regarded as critical.

Having thus described our invention, what we claim as new and desire to secure by Letters Patent is:

1. The method of treating lead oxide which comprises forming a layer of lead oxide particles approximately 1/8 inch in depth, exposing the individual particles to an oxidizing atmosphere at a temperature of approximately 925° F. to 1200° F. while constantly applying an agitating force such as will individually and separately agitate the particles in order to prevent undue agglomeration thereof.

2. The method of treating leady litharge which comprises forming a layer of the leady litharge particles approximately 1/8 inch in depth, and constantly advancing same through a heated oxidizing zone at a temperature of approximately 925° F. to 1200° F. for a limited period of time while constantly applying an agitating force such as will individually and separately agitate the particles in order to prevent undue agglomeration thereof.

3. The method of treating red tetragonal lead monoxide which comprises advancing red tetragonal lead monoxide particles in a layer approximately 1/8 inch in depth within a heated zone and converting the lead oxide to the yellow rhombic system by a sudden rise in temperature to approximately 925° F. to 1200° F. for a limited period of time while constantly applying an agitating force such as will individually and separately agitate the particles in order to prevent undue agglomeration thereof.

4. The method of treating red tetragonal lead monoxide which comprises advancing a layer of same approximately 1/8 inch in depth through a heated zone, converting the tetragonal lead monoxide to the yellow rhombic system by suddenly raising the temperature of the layer to approximately 1000° to 1200° F. while constantly applying an agitating force such as will individually and separately agitate the particles in order to prevent undue agglomeration thereof, and suddenly cooling the layer immediately upon removal thereof from the heated zone.

5. The method of treating leady litharge which comprises forming a layer of leady litharge approximately 1/8 inch in depth, advancing the layer through an oxidizing zone at a temperature of approximately 1000° F. to 1200° F. while constantly applying an agitating force such as will individually and separately agitate the particles in order to prevent undue agglomeration thereof, and cooling the layer immediately upon removal from the heated zone.

6. The method of treating lead oxide which comprises forming a uniform layer thereof approximately 1/8 inch in depth, exposing the layer to an oxidizing atmosphere at a temperature ranging from 925° F. to 1200° F. for a limited period of time, while constantly applying an agitating force such as will individually and separately agitate the particles in order to prevent undue agglomeration thereof, and removing and cooling the layer immediately after the oxidation is completed.

JOHN S. NORDYKE.
LEONARD VAUGHN.